(12) United States Patent
Campbell et al.

(10) Patent No.: US 7,478,255 B2
(45) Date of Patent: Jan. 13, 2009

(54) CLOCK DISTRIBUTION IN MULTI-CELL COMPUTING SYSTEMS

(75) Inventors: Robert G. Campbell, Cupertino, CA (US); Spencer Frink, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 447 days.

(21) Appl. No.: 11/304,370

(22) Filed: Dec. 13, 2005

(65) Prior Publication Data

US 2007/0136620 A1      Jun. 14, 2007

(51) Int. Cl.
*G06F 1/12* (2006.01)
(52) U.S. Cl. .................. 713/400; 713/401; 713/500; 713/501; 713/502; 713/503; 713/600; 713/601
(58) Field of Classification Search ......... 713/400–401, 713/500–503, 600–601
See application file for complete search history.

(56) References Cited

U.S. PATENT DOCUMENTS 7,035,247 B2 * 4/2006 Ofek et al. ............... 370/350
7,050,450 B1 * 5/2006 Hennen et al. ............. 370/426
2007/0058078 A1 * 3/2007 Champion ................. 348/513

* cited by examiner

*Primary Examiner*—Abdelmoniem Elamin (57) ABSTRACT

Embodiments of the invention relate to distribution of clocks to CPUs in processing cells of a multi-cell system. In an embodiment, each cell includes an interface, referred to as an agent. A plurality of interfaces, referred to as switches, together with the agents of the cells, connects the cells together. A clock source provides a clock to a switch, which replicates the clock and provides the replicated clocks to its ports. Each port of the switch, receiving a replicated clock, encodes this replicated clock and sends it over a link to each agent of a cell. Each agent of the cells, receiving an encoded clock, decodes this encoded clock, resulting in a decoded, or an extracted, clock. The agent then replicates the extracted clock and provides the replicates of the extracted clock to a plurality of CPUs of the cell. As a result, CPUs in all cells of the system receive clocks that all are synchronized to the clock provided by the clock source. Other embodiments are also disclosed including using the extracted clock as phase information, scaling, redundancy, etc.

12 Claims, 6 Drawing Sheets

CLOCK DISTRIBUTION IN MULTI-CELL COMPUTING SYSTEMS

BACKGROUND OF THE INVENTION

A clock provided to various cells in a multi-cell computer system may be referred to as a single point of failure because, when the clock fails, all cells using the clock fail. Further, in situations where clock redundancy is desirable, distributing redundant clocks from a clock source to various cells can add expense, pin counts in a chip, etc. To solve such problems, one solution uses a clock source for each cell, resulting in independent clocks from different clock sources. However, because of different sources, the clocks are no longer synchronous, or drift. That is, they assert different periods. In critical applications, even a small clock drift is not acceptable, and synchronizing these independent clocks to eliminate the drifts can require complicated mechanisms.

SUMMARY OF THE INVENTION

Embodiments of the invention relate to distribution of clocks to CPUs in processing cells of a multi-cell system. In an embodiment, each cell includes an interface, referred to as an agent. A plurality of interfaces, referred to as switches, together with the agents of the cells, connects the cells. A clock source provides a clock to a switch, which replicates the clock and provides the replicated clocks to its ports. Each port of the switch, receiving a replicated clock, encodes this replicated clock and sends it over a link to each agent of a cell. Each agent of the cells, receiving an encoded clock, decodes this encoded clock, resulting in a decoded, or extracted, clock. The agent then replicates the extracted clock and provides the replicates of the extracted clock to a plurality of CPUs of the cell. As a result, CPUs in all cells of the system receive clocks that all are synchronized to the clock provided by the clock source. Other embodiments are also disclosed including using the extracted clock as phase information, scaling, redundancy, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF VARIOUS EMBODIMENTS

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
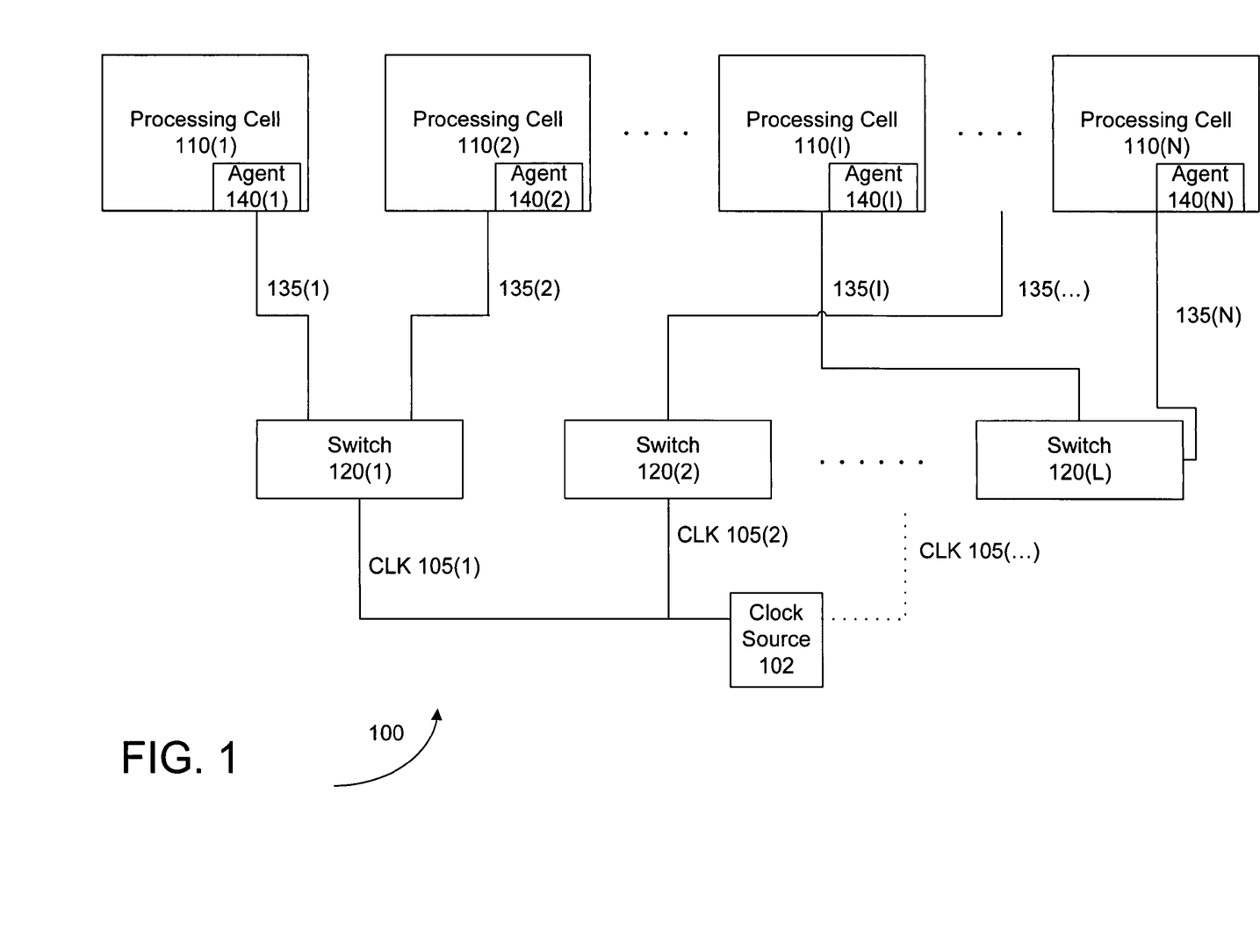
FIG. 1 shows an arrangement upon which embodiments of the invention may be implemented.

FIG. 1 shows a system 100 upon which embodiments of the invention may be implemented. System 100 includes a plurality of processing cells, e.g., cells 110(1) to 110(N) and a plurality of interfaces or switches 120, e.g., 120(1) to 120(L). System 100 is a SMP (Symmetric MultiProcessing) system in which multiple processors or CPUs (central processing units, not shown) can complete individual processes simultaneously. An idle CPU can be assigned any task, and additional CPUs can be added to improve performance and handle increased loads. A thread may be initiated by one CPU and subsequently runs on another CPU. One or a plurality of processing cells 110 may be partitioned to form a system running an operating system.

Clock source 102 provides a clock CLK on each line 105 to switches 120, each of which then provides this clock CLK in an encoded form and combined with data on lines 135 to an agent 140 of each cell 110. Each cell 110, upon receiving the encoded and combined-with-data clock, extracts such clock, i.e., decodes the clock, replicates the decoded clock and provides the replicated clocks to its CPUs (not shown). Details of such encoded/decoded clocks will be described below. In an embodiment, clock CLK runs at 200 Mhz, and resides on a back plane board of a computer system. However, embodiments of the invention are not limited to the speed of clock CLK or where it resides.

A processing cell 110 includes a plurality of CPUs, memory, caches, etc., (all of which are not shown) and an agent 140. A processing cell 110 interfaces with a switch 120 via its agent 140. In an embodiment, a switch 120 is comparable to an agent 140. However, embodiments of the invention are not limited to the structure of switches 120, agents 140, or whether they are comparable. Both switches 120 and agents 140 enable CPUs of different architectures, e.g., having parallel and/or serial bus, to be used in the same system, e.g., system 100.

Switches 120 enable multiple cells 110 to be connected, and if desired, one or a plurality of cells 110 connected by switches 120 can operate as an independent computer system running an operating system image. A switch 120 is also coupled to other I/O interfaces from which I/O devices may be connected to switch 120, including PCI devices, PCI-express devices, boot ROMs, etc.

Links 135 are means for data and clock CLK that, in an embodiment, is in an encoded form, to be distributed to cells 110. A link 135 includes a plurality of bits and carries data from (and to switch) 120 to (and from) agent 140 on bit "lanes", each one of which is unidirectional. Link 135 in aggregate is bidirectional. Depending on implementations, links 135 may be referred to as frontside bus, shared bus, computer scalable interface (CSI), etc.

FIRST EMBODIMENT

Using the Extracted Clock to Directly Feed the CPUs

Figure 2:
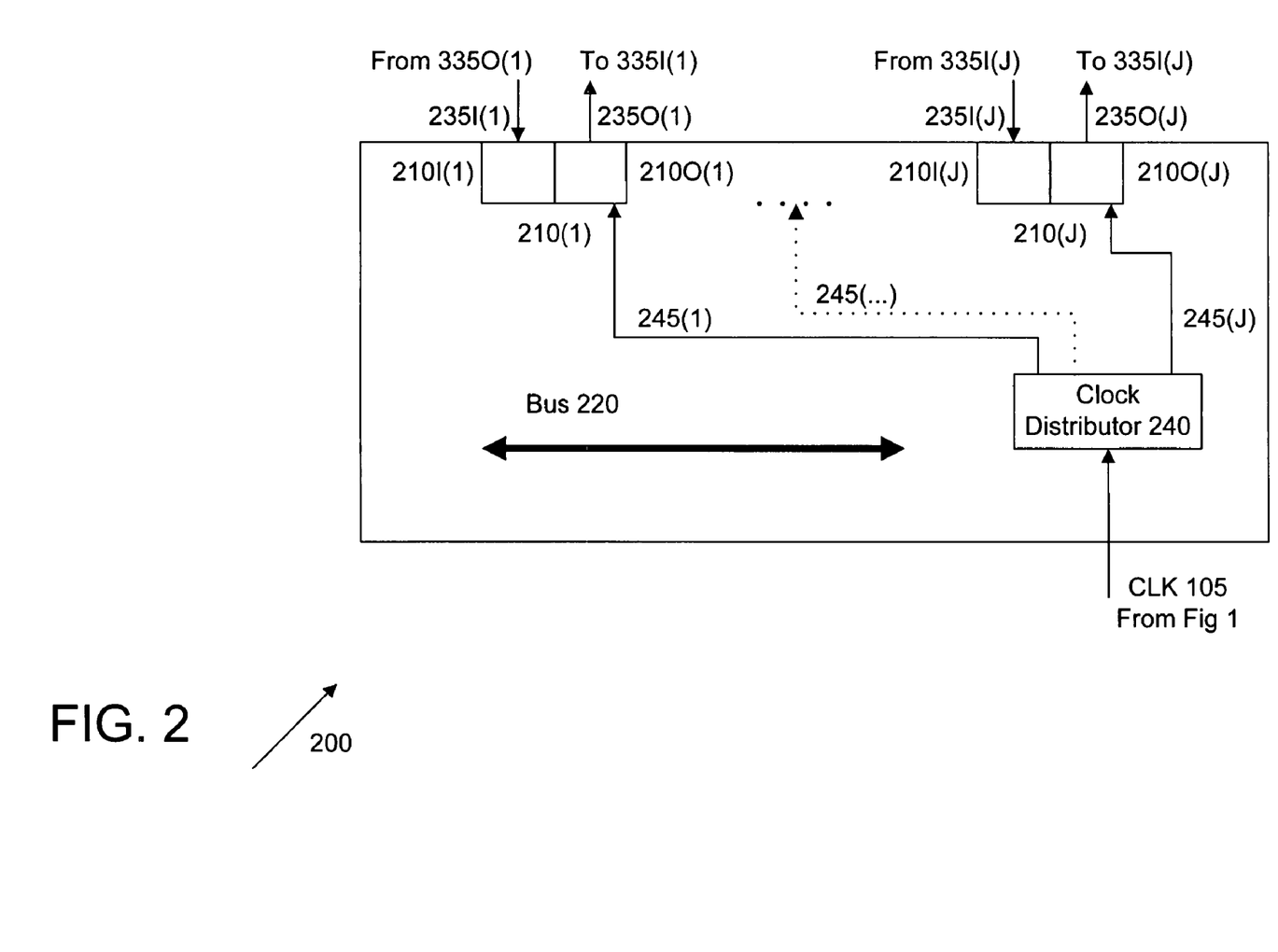
FIG. 2 shows a switch, in accordance with an embodiment.

FIG. 2 shows a switch 200 being an embodiment of a switch 120. Switch 200 includes multiple ports 210 each of which is used to interface with a cell 110. FIG. 2 shows that switch 200 interfaces with J number of cells 110.

A port 210 includes an outbound port 210O and an inbound port 210I. An outbound port 210O is commonly referred to as a serializer as it accepts parallel inputs and provides serial output. Conversely, an inbound port 210I is commonly referred to as a de-serializer as it accepts serial input and provides parallel output. As a result, a port 210 may be referred to as a serdes (serializer de-serializer). An outbound port 210O sends data via a line 235O to agent 140 while an inbound port 210I receives data from agent 140 via line 235I. A line 235O and a line 235I are part of a line 135 in FIG. 1.

Figure 3:
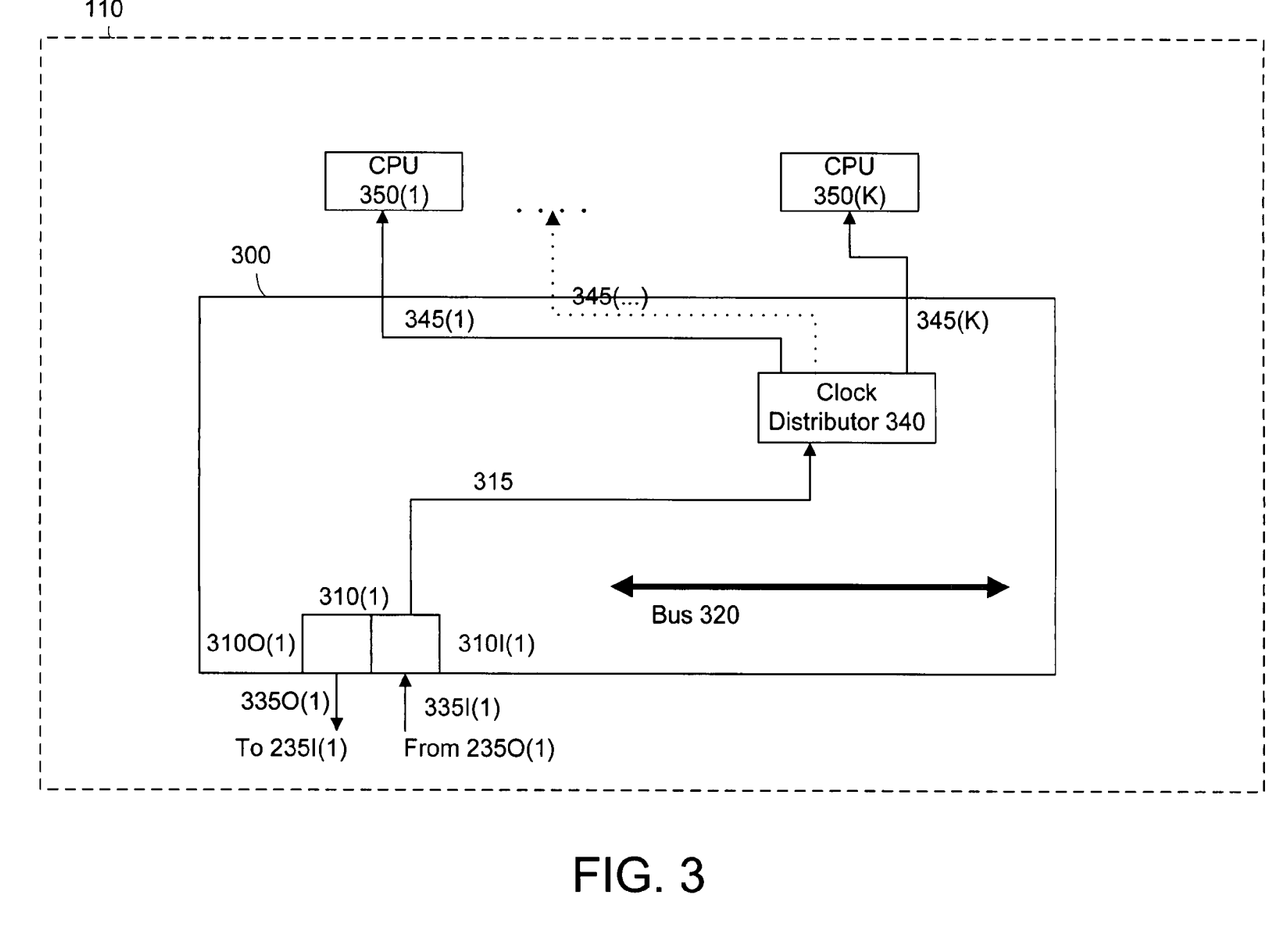
FIG. 3 shows an agent inside a processing cell, in accordance with an embodiment.

Clock distributor 240 receives clock CLK on line 105 (FIG. 1), replicates this clock and provides the replicated clocks, each on a line 245 to an outbound port 210O. In an embodiment, each outbound port 210O encodes the clock CLK on line 245 using the 8B10B algorithm and transmits this encoded clock together with other data in a bitstream on line 235O to line 335I of agent 300 (FIG. 3). In effect, if a switch 200 is to interface with J number of processing cells 110, then there are J number of replicated clocks CLK on lines 245, J number of encoded clocks CLK on J number of lines 335I of J number of agents 300 of J processing cells 110. The 8B10B encode algorithm is used in an embodiment; however, various other encode mechanisms are within scope of embodiments of the invention, and the invention is not limited to a particular encode algorithm/mechanism.

Bus 220, known in the art, allows data to be moved between different elements of switch 120 and processing cells 110 and other components. To avoid obscuring the drawings, bus 220 is shown to stand by itself, i.e., not being connected to any other components. However, those skilled in the art will recognize that bus 220 can be connected to different elements as appropriate including, for example, CPU, memory, I/O devices, serdes 210, etc. In fact, in an embodiment, data to be combined with the clock (discussed above) comes from buss 220.

FIG. 3 shows an agent 300 being an embodiment of an agent 140 that is inside a processing cell 110. Similar to a switch 200, agent 300 includes multiple ports or serdes 310, and a port 310 includes an outbound port 310O and an inbound port 310I. However, for illustration purposes, only one port 310 is shown in FIG. 3. An outbound port 310O sends data via line 335O to switch 200 while an inbound port 310I receives data from switch 200 via line 335I. A line 335O and a line 335I are part of a line 135 in FIG. 1. Further, when a switch 200 is connected to an agent 300, a line 235O of the switch 200 is connected to a line 335I of the agent 300, and a line 235I of the switch 200 is connected to a line 335O of the agent 300.

Each inbound port 310I that receives a bitstream including an encoded clock CLK and data on line 335I splits the bitstream into data and clock. The inbound port 310I then decodes the encoded clock CLK to provide a decoded clock CLK on line 315. For illustration purposes the clock CLK on line 315 is referred to as the decoded or extracted clock.

Clock distributor 340 receives the clock CLK on line 315, replicates this clock and provides the replicated clocks each on a line 345 to each CPU 350 of a processing cell 110. These clocks CLK on lines 345 are synchronous, e.g., having the same periods, with the clock CLK provided by clock generator 102 on line 105, even though the extracted clocks CLK on lines 345 and the clock CLK on line 105 may be out of phase. In effect, CPUs 350 in a processing cell 110 that receive the extracted clocks CLK on lines 345 have a clock that is synchronous to the clock on line 105.

Bus 320, like bus 220, allows data to be moved between different elements of agent 300 and processing cells 110. Further, to avoid obscuring the drawings, bus 320 is shown as standing by itself, but, in reality, bus 320 is connected to various other elements like bus 220.

This embodiment of the invention is advantageous because it does not require a clock source on each cell 110 as the clocks CLK on line 345 provided to the CPUs of the cell are replicated from a clock extracted from the serial link 335I.

SECOND EMBODIMENT

Using the Extracted Clock as Phase Lock

Embodiments of the invention also use the extracted clock CLK on line 315 (FIG. 3) as phase information to synchronize clocks in different processing cells 110 and thus eliminate clock drifts between such cells. Thermal changes in the chip embodying processing cells 110 is one cause for clock drifts.

Figure 4:
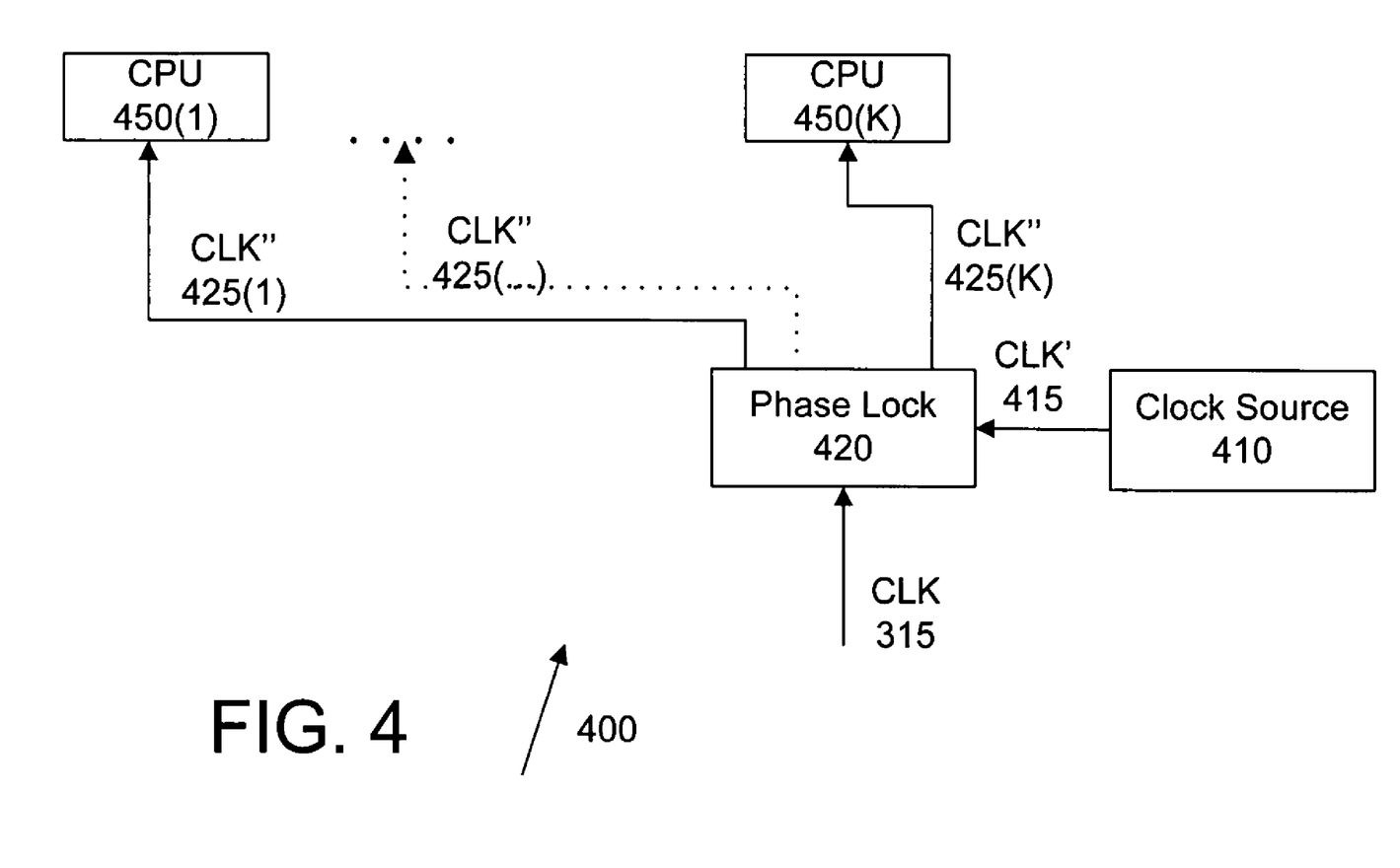
FIG. 4 shows an arrangement illustrating using the extracted clock as phase information, in accordance with an embodiment.

FIG. 4 shows a diagram 400 illustrating how an extracted clock CLK on line 315 is used as phase information, in accordance with an embodiment. Clock source 410 provides a clock CLK' on line 415 running at a frequency used by CPUs 450, which, for illustration purposes, is 400 Mhz. The clock CLK on line 315 is used as phase lock information so that phase lock function 420 synchronizes the clock CLK' on line 415 to the phase of the clock CLK on line 315 and replicates the synchronized clock CLK" onto lines 425.

By providing clock source 410, one per cell 110, CPUs 450 are still in operation even if other circuits related to the extracted clock CLK on line 315 are not operational. For example, even if the extracted clock CLK on line 315 is not operational, clock source 410 independently provides the clock CLK' on line 415 and thus the clock CLK" on lines 425. As a result, processing cells 450, having the clocks CLK" on lines 425 continue to function. Further, a circuit 400 may be used in each cell 110, and because CPUs in different cells 110 use the same mechanisms in terms of providing the clocks CLK" on lines 425, these clocks CLK" on lines 425 to CPUs 450 both of the same cell and of another cell do not drift relative to the clock CLK' on line 415 provided by clock source 410.

Scaling

In various embodiments of the invention, the clocks on lines 105 (FIG. 1), 245, 235O (FIG. 2), 335I, 315, and 345 (FIG. 3) run at different speeds. This is because, normally, it is desirable to have a very high speed, e.g., 2-5 Ghz on links 135 (235O and 335I) to have a faster data transfer rate between processing cells 110. Further, it is typical for the clock source 102 to provide a clock CLK on line 105 in a specified range much lower than that of links 135, e.g., 200 Mhz to 1 Ghz. Additionally, depending on implementations taking considerations of cost and particular applications, CPUs in cells 110 including CPUs 350 may run at a wide range of frequencies that is also lower than that of links 135, e.g., in the range of 400 Mhz to 1 Ghz. As a result, embodiments of the invention, receiving the clock CLK on line 105 from clock source 102, provide scaling techniques to achieve the desired speed on lines 345 for CPUs 350. For example, the clock CLK on line 105 may run at 200 Mhz, and it is typically for link 235O (or 335I) to run at 2 Ghz while CPUs 350 desire a speed of 400 Mhz on lines 345. Embodiments of the invention use scale-up and scale-down techniques so that even with a clock source on line 105 that is at 200 MHZ, CPUs 350 can still receive clocks at a desired speed of 400 Mhz. For example, clock distributor 240 scales up the speed ten times so that the speed on line 245 or on lines 235O to be 2 Ghz even though clock distributor 240 receives the clock CLK 105 running at 200 Mhz. The clock speed on lines 245 is the same as that of on lines 235O because the clock on lines 245 serves as an input for outbound port 210O that transmits the clock on lines 245 to lines 235O. Further, the clock speed on line 335I is the same as that of the clock CLK on line 315, which is 2 Ghz. As the desired clock speed on lines 345 is 400 Mhz, clock distribution 340 scales down five times the clock on lines 315 from 2 Ghz to 400 Mhz on lines 345. Embodiments of the invention use well known scaling techniques such as using a counter having the to-be-scaled clock as an input, and selecting the appropriate output bits. That is, embodiments select the less significant bits for a faster clock speed and select the more significant bits for a slower clock speed, etc.

Embodiments of the invention recognize the desire for various speeds at different points, e.g., lines 105, 245, 345, etc., but are not limited to a particular speed at each point.

Redundancy

Figure 5:
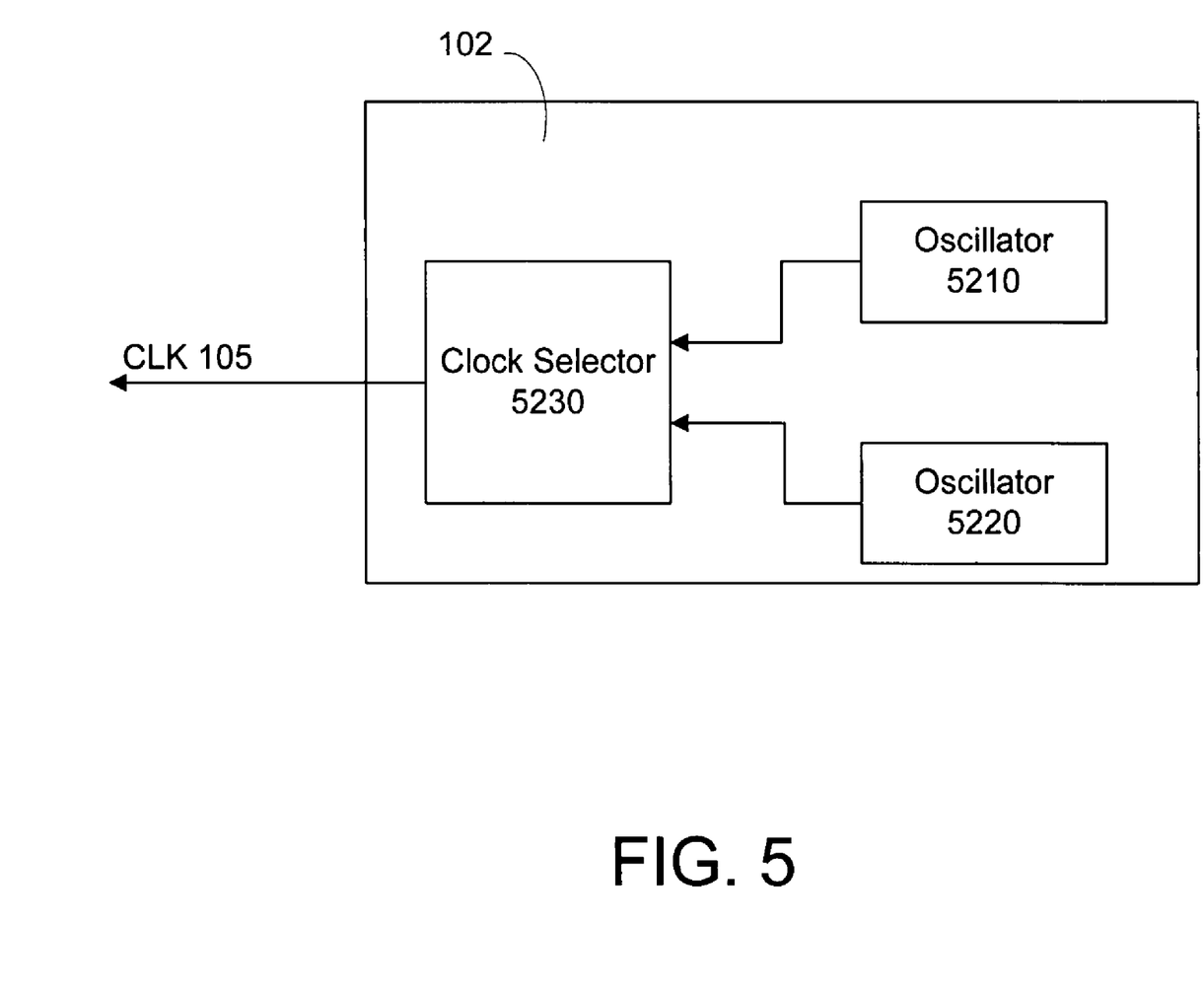
FIG. 5 shows an arrangement illustrating redundancy of the clock source, in accordance with an embodiment.

FIG. 5 shows a diagram 500 illustrating redundancy for clock source 102, in accordance with an embodiment. Oscillator 5210 serves as a default clock source while oscillator 5220 serves as a fail-over clock source. That is, generally, clock selector 5230 selects oscillator 5210 to provide the clock CLK on line 105 (FIG. 1), and, when oscillator 5210 fails, clock selector 5230 selects oscillator 5220 to provide the clock CLK on line 105. In accordance with embodiments of the invention, various mechanisms, such as a multiplexer, may serve as clock selector 5230. Further, oscillators 5210 and 5220 are used for illustration purposes only, various other mechanisms providing fail-over mechanisms/redundancy for the clock CLK on line 105 are within the scope of embodiments of the invention.

Figure 6:
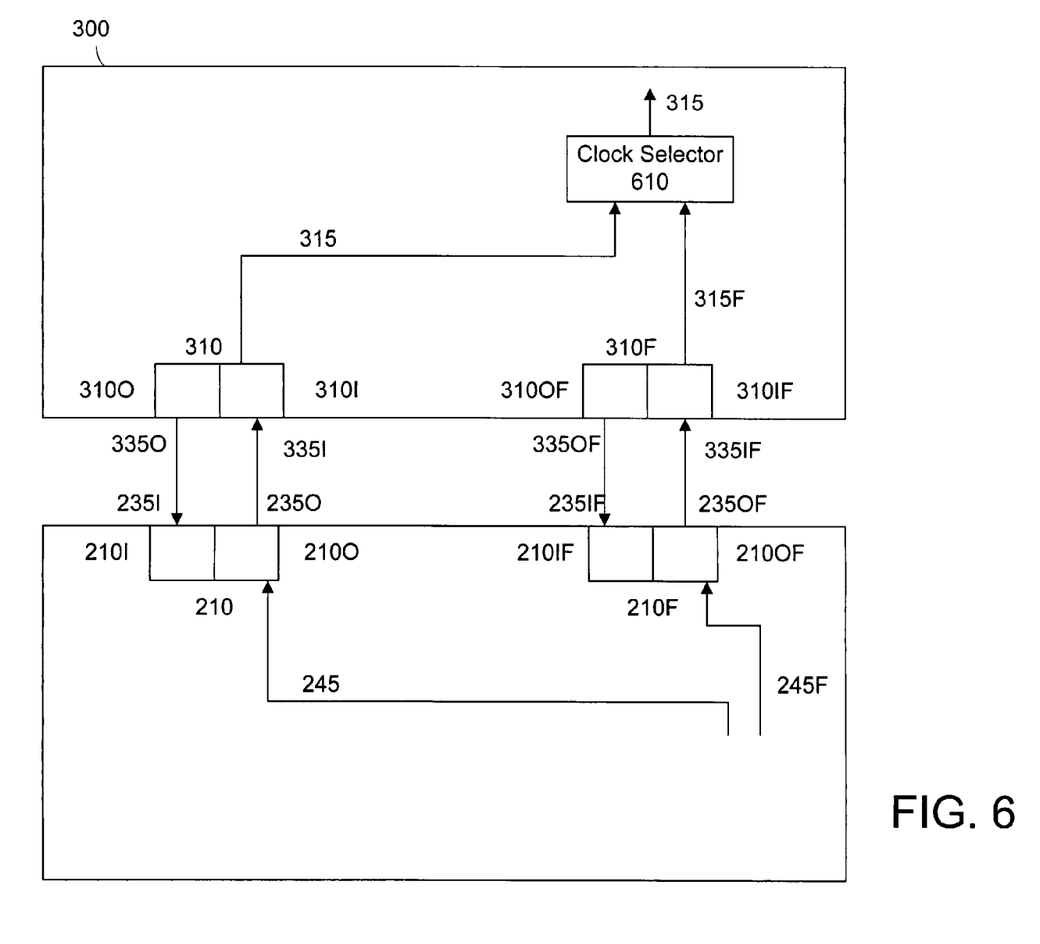
FIG. 6 shows an arrangement illustrating redundancy of elements of FIG. 3 and FIG. 4.

FIG. 6 shows a diagram 600 illustrating redundancy for a various elements of FIG. 1, in accordance with an embodiment. As illustrated above, a line 135 includes a line 235O (or 335I) and a line 235I (or 335O). FIG. 6 shows that, corresponding to a serdes 220, there is a failed-over serdes, e.g., 220F, and, corresponding to a serdes 320, there is a failed-over serdes, 320F. Corresponding to a clock CLK on line 245, there is a failed-over clock CLK on line 245F. Similarly, corresponding to a line 235O (or 335I), there is a failed-over line 235OF (or 335IF), and corresponding to a line 235I (or 335O), there is a failed-over line 235IF (or 335OF). Further, corresponding to an extracted clock CLK on line 315, there is a failed-over CLK on line 315F. Additionally, a clock selector 610 selects the clock on line 315 (or 315F) as an input to clock distributor 340 or phase lock 420 in FIG. 3 or FIG. 4, respectively.

Similar to FIG. 5, various methods may be used to provide the failed-over mechanisms described in FIG. 6, and embodiments of the invention are not limited to a particular method.

Embodiments of the invention are advantageous over other approaches because embodiments can save cost in distributing the clocks to different processing cells. Embodiments also eliminate problems in clock drifts. The clocks on lines 345 on the same and different cells 110 are synchronized with the clock on lines 105. Similarly, the clocks on lines 425 on the same and different cells are synchronized with the clock on lines 105.

In the foregoing specification, the invention has been described with reference to specific embodiments thereof. However, it will be evident that various modifications and changes may be made thereto without departing from the broader spirit and scope of the invention. Accordingly, the specification and drawings are to be regarded as illustrative rather than as restrictive.

What is claimed is:

1. A system comprising:
   a plurality of processing cells each having a plurality of processors; and
   each processing cell receiving an extracted clock for use in at least one of the following ways
   a) the extracted clock being replicated to provide a plurality of first clocks each being fed to a processor of the processing cell;
   b) the extracted clock being used as phase information in conjunction with a first clock source to provide a plurality of second clocks each being fed to a processor of the processing cell;
   wherein the extracted clock was extracted from an encoded clock being combined with data and sent to the processing cell over a link that allows at least two processing cells to communicate with one another via a switch;
   wherein the link is associated with a failed-over link, the encoded clock is associated with a failed-over encoded clock, the extracted clock is associated with a failed-over extracted clock, the first clock source is associated with a failed-over first clock source.

2. The system of claim 1 wherein the encoded clock was encoded using an 8B10B algorithm.

3. The system of claim 1 wherein the plurality of first clocks runs at a first frequency resulted from a second frequency used by the link and the second frequency is resulted from a third frequency run by a clock provided by a second clock source.

4. The system of claim 1 wherein the plurality of second clocks runs at a first frequency resulted from a second frequency used by the link and the second frequency is resulted from a third frequency run by a clock provided by a second clock source.

5. A system comprising:
   means for providing a plurality of clocks being encoded and combined with data over a plurality of links; and
   a plurality of processing cells each having an agent; each agent of a processing
   cell extracting a clock, replicating the extracted clock to provide a plurality of replicated clocks to a plurality of processors of the processing cells; wherein the plurality of replicated clocks in at least two processing cells are being synchronized with a clock provided by a clock source providing the plurality of clocks being encoded and combined with data over the plurality of links; wherein the replicated clocks run at a first frequency scaled down from a second frequency run by the plurality of encoded and combined clocks and the second frequency is scaled up from a third clock frequency run by the clock source.

6. The system of claim 5 wherein at least one of the following is done:
   the clock source being associated with a failed-over clock source;
   a link of the plurality of links being associated with a failed-over link; and
   the extracted clock being associated with a failed-over extracted clock.

7. A system comprising:
   means for providing a plurality of clocks being encoded and combined with data over a plurality of links; and
   a plurality of processing cells each having an agent; each agent of a processing cell extracting an encoded and combined clock, using the extracted clock as phase information in conjunction with a first clock source to provide a plurality of first clocks to a plurality of processors of the processing cell; wherein the plurality of first clocks in at least two processing cells are synchronized with a clock provided by a second clock source providing the plurality of clocks being encoded and combined with data over the plurality of links;

wherein at least one of the following is done the first clock source being associated with a failed-over first clock source, the second clock source being associated with a failed-over second clock source, a link of the plurality of links being associated with a failed-over link, the extracted clock being associated with a failed-over extracted clock.

8. The system of claim 7 wherein the first clocks run at a first frequency scaled down from a second frequency run by the plurality of encoded and combined clocks and the second frequency is scaled up from a third clock frequency run by the second clock source.

9. A system comprising:

a first clock source providing a first clock;

a switch receiving the first clock and replicating the first clock to provide a plurality of second clocks to a plurality of ports of the switch; a port encoding a second clock to provide an encoded third clock to a link, resulting in a plurality of encoded third clocks on a plurality of links;

a plurality of agents each receiving an encoded third clock from a link of the plurality of links, decoding this encoded third clock to provide an extracted clock; thereby resulting in a plurality of extracted clocks each corresponding to an agent; and a plurality of processing cells each including an agent of the plurality of agents; thereby resulting in each processing cell of the plurality of processing cells corresponding to an extracted clock of the plurality of extracted clocks;

wherein an extracted clock corresponding to a processing cell is used in at least one of the following ways:

a) the extracted clock being replicated to provide a plurality of fourth clocks each being fed to a processor of the processing cell;

b) the extracted clock being used as phase information in conjunction with a second clock source to provide a plurality of fifth clocks being fed to a processor of the processing cell.

10. The system of claim 9 wherein at least one of the following is associated with a failed-over: the first clock, a second clock, an encoded third clock, an extracted clock, a link, a fourth clock, and a fifth clock.

11. The system of claim 9 wherein a fourth clock of the plurality of fourth clocks runs at a first frequency calculated from a second frequency of the first clock via at least one of a scale up and a scale down technique.

12. The system of claim 9 wherein a fifth clock of the plurality of fifth clocks run at a first frequency calculated from a second frequency of the first clock via at least one of a scale up and a scale down technique.

* * * * *

UNITED STATES PATENT AND TRADEMARK OFFICE
CERTIFICATE OF CORRECTION

| | |
|---|---|
| PATENT NO. | : 7,478,255 B2 |
| APPLICATION NO. | : 11/304370 |
| DATED | : January 13, 2009 |
| INVENTOR(S) | : Robert G. Campbell et al. |

It is certified that error appears in the above-identified patent and that said Letters Patent is hereby corrected as shown below:

In column 6, lines 65-66, in Claim 7, delete "in formation" and insert -- information --, therefor.

In column 8, line 26, in Claim 12, delete "run" and insert -- runs --, therefor.

Signed and Sealed this

Second Day of June, 2009

JOHN DOLL
*Acting Director of the United States Patent and Trademark Office*